United States Patent
Etkin et al.

(10) Patent No.: US 9,143,218 B2
(45) Date of Patent: Sep. 22, 2015

(54) EXTRAPOLATING CHANNEL STATE INFORMATION ("CSI") ESTIMATES FROM MULTIPLE PACKETS SENT OVER DIFFERENT FREQUENCY CHANNELS TO GENERATE A COMBINED CSI ESTIMATE FOR A MIMO-OFDM SYSTEM

(75) Inventors: Raul Hernan Etkin, Mountain View, CA (US); Jung Gun Lee, Mountain View, CA (US); Sung-Ju Lee, Redwood City, CA (US); Riccardo Crepaldi, Champaign, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/240,533

(22) PCT Filed: Sep. 23, 2011

(86) PCT No.: PCT/US2011/053151
§ 371 (c)(1),
(2), (4) Date: Feb. 24, 2014

(87) PCT Pub. No.: WO2013/043201
PCT Pub. Date: Mar. 28, 2013

(65) Prior Publication Data
US 2015/0078470 A1    Mar. 19, 2015

(51) Int. Cl.
H04B 7/08    (2006.01)
H04B 7/06    (2006.01)
(Continued)

(52) U.S. Cl.
CPC .............. *H04B 7/066* (2013.01); *H04L 25/022* (2013.01); *H04L 25/0206* (2013.01);
(Continued)

(58) Field of Classification Search
USPC ........................................................ 375/260
See application file for complete search history.

(56) References Cited

U.S. PATENT DOCUMENTS

| | | | |
|---|---|---|---|
| 7,260,055 | B2 | 8/2007 | Wang et al. |
| 7,430,256 | B2 | 9/2008 | Zhidkov |

(Continued)

FOREIGN PATENT DOCUMENTS

| | | |
|---|---|---|
| WO | WO-2009127033 | 10/2009 |
| WO | WO-2010024556 | 3/2010 |
| WO | WO-2011055986 | 5/2011 |

OTHER PUBLICATIONS

Chang-Jun Ahn et al., Pilot Frequency Nulling based Channel Estimation for Multiple QR-Decompositions with Transposed Channel Matrix SDM/OFDM, In: Information Theory Workshop 2006, ITW '06 Chengdu, IEEE, Oct. 22-26, 2006, pp. 3636-3640, ISBN 1-4244-0067-8.

(Continued)

*Primary Examiner* — Kevin Kim
(74) *Attorney, Agent, or Firm* — Hewlett-Packard Patent Department (57) ABSTRACT

A method for extrapolating channel state information ("CSI") estimates from multiple packets sent over different channels to generate a combined CSI estimate for a MIMO-OFDM system is disclosed. Packets are received on an m×n×$W_i$ channel configuration, wherein m is the number of receive antennas used to receive the packets, n is the number of transmit antennas used to transmit the packets, and $W_i$ is the number of OFDM channels for a packet i in the MIMO-OFDM system. CSI estimates are generated for the received packets and the CSI estimates are extrapolated to generate a combined CSI estimate for an m×n×R channel configuration, wherein R>$W_i$.

14 Claims, 9 Drawing Sheets

(51) Int. Cl.
  *H04L 25/02* (2006.01)
  *H04L 25/03* (2006.01)
  *H04B 7/04* (2006.01)

(52) U.S. Cl.
  CPC ......... *H04L 25/0236* (2013.01); *H04B 7/0417* (2013.01); *H04L 2025/03414* (2013.01); *H04L 2025/03426* (2013.01)

(56) References Cited

U.S. PATENT DOCUMENTS

| | | | |
|---|---|---|---|
| 8,130,858 B1* | 3/2012 | Lee et al. ................. | 375/267 |
| 2004/0081074 A1* | 4/2004 | Piechocki ................. | 370/206 |
| 2005/0129137 A1 | 6/2005 | Yamada et al. | |
| 2007/0060073 A1 | 3/2007 | Boer et al. | |
| 2008/0139153 A1 | 6/2008 | Tuo et al. | |
| 2008/0232488 A1 | 9/2008 | Sandell et al. | |
| 2009/0196166 A1 | 8/2009 | Hamaguchi et al. | |
| 2009/0239494 A1 | 9/2009 | Park et al. | |
| 2010/0040163 A1 | 2/2010 | Caire et al. | |
| 2010/0087151 A1 | 4/2010 | Auer | |
| 2010/0271931 A1 | 10/2010 | Cheng et al. | |
| 2010/0322351 A1 | 12/2010 | Tang et al. | |
| 2011/0069790 A1 | 3/2011 | Okehie | |
| 2011/0128924 A1 | 6/2011 | Coon et al. | |

OTHER PUBLICATIONS

Chao Zhang et al., A Simple Distributed Relay-Assignment Algorithm for Multi-Antenna Relay Networks, In: Communications and Networking in China, Third International Conference on, Aug. 25-27, 2008, pp. 393-397, ISBN 978-1-4242-2373-6.

International Search Report and Written Opinion, PCT Application No. PCT/US2011/053149, Feb. 28, 2012.

International Search Report and Written Opinion, PCT Application No. PCT/US2011/053151, Apr. 10, 2012.

Riccardo Crepaldi et al., CSI-SF: Estimating Wireless Channel State Using CSI Sampling & Fusion, The 17th Annual International Conference on Mobile Computing and Networking, Mobicom, Las Vegas, Sep. 20, 2011, Poster.

Riccardo Crepaldi et al., CSI-SF: Estimating Wireless Channel State Using CSI Sampling & Fusion, The 17th Annual International Conference on Mobile Computing and Networking, Mobicom, Las Vegas, Sep. 20, 2011, pp. 1-3.

Ye (Geoffrey) Li, Simplified Channel Estimation for OFDM Systems with Multiple Transmit Antennas, IEEE Transactions on Wireless Communcations, vol. 1, No. 1, Jan. 2002, pp. 67-75.

* cited by examiner

EXTRAPOLATING CHANNEL STATE INFORMATION ("CSI") ESTIMATES FROM MULTIPLE PACKETS SENT OVER DIFFERENT FREQUENCY CHANNELS TO GENERATE A COMBINED CSI ESTIMATE FOR A MIMO-OFDM SYSTEM

CROSS-REFERENCE TO RELATED APPLICATION

This application is a U.S. National Stage Application of and claims priority to International Patent Application No. PCT/US2011/053151, filed on Sep. 23, 2011, and entitled "Extrapolating Channel State Information ("CSI") Estimates from Multiple Packets Sent Over Different Frequency Channels to Generate a Combined CSI Estimate for a MIMO-OFDM System," which is related to International Patent Application No. PCT/US2011/053149, entitled "Extrapolating Channel State Information ("CSI") Estimates from Multiple Packets Sent Over Different Frequency Channels to Generate a Combined CSI Estimate for a MIMO-OFDM System" filed on Sep. 23, 2011 and herein incorporated by reference in its entirety.

BACKGROUND

The deployment of 802.11 Wireless Local Area Networks ("WLANs") has recently experienced explosive growth as multiple applications and services now demand high throughput networks. One of the key features of high speed WLANs is the use of Multiple Input, Multiple Output ("MIMO") antenna technology that offers significant increases in data throughput and link range without additional bandwidth or transmit power. Performance improvements are also achieved with the use of Orthogonal Frequency-Division Multiplexing ("OFDM") modulation to convert a wideband channel into multiple narrowband channels in order to avoid inter-symbol interference ("ISI").

A MIMO-OFDM channel is described with fine granularity by Channel State Information ("CSI"), which represents the current conditions and properties of the channel. CSI is provided in the 802.11n hardware by analyzing received packets with training sequences in the packet headers. For network algorithms such as rate selection, access point ("AP") association, channel assignment, etc., to make a timely, optimal decision, accurate CSI estimates under various settings (e.g., different number of spatial streams, transmission antennas used, transmission powers, etc.) must be known. However, some of these settings might not be sampled in recently received packets and additional packet transmissions are required to obtain the complete CSI to accurately characterize the channel. This extra process consumes bandwidth and increases latency, and hence such unnecessary sampling should be avoided.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A receiver and method for extrapolating Channel State Information ("CSI") estimates from multiple packets sent over different frequency channels to generate a combined CSI estimate for a MIMO-OFDM system are disclosed. As generally described herein, CSI represents the current conditions and properties of a channel and consists of the attenuation and phase shift experienced by each spatial stream to each receive antenna in each of the OFDM subcarriers. CSI is derived from successfully received packets in 802.11n systems by using training sequences (e.g., pilot sequences) included in the packet's preamble.

In various embodiments, CSI estimates obtained from a small number of packets sent over a given bandwidth are extrapolated to derive a combined CSI estimate for a larger bandwidth. The combined CSI estimate represents a channel state that has not been sampled and that is different and larger than the channel states used to send and receive the packets. For example, a combined 2×2×114 CSI estimate for a 40 MHz channel may be derived by extrapolating CSI estimates obtained from two packets transmitted using a 2×2×56 configuration for a 20 MHz channel. More generally, a combined CSI estimate may be derived for any m×n×R channel configuration using CSI estimates obtained from packets received with an m×n×$W_i$ channel configuration, for n transmit and m receive antennas, where $W_i$ and R are the number of OFDM channels used in the system for the packet i and indicate the bandwidth of the MIMO-OFDM channel, and $R > W_i$.

It is appreciated that embodiments described herein below may include various components and features. Some of the components and features may be removed and/or modified without departing from a scope of the receiver, module, and method for extrapolating CSI estimates to generate a combined CSI estimate. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Figure 1:
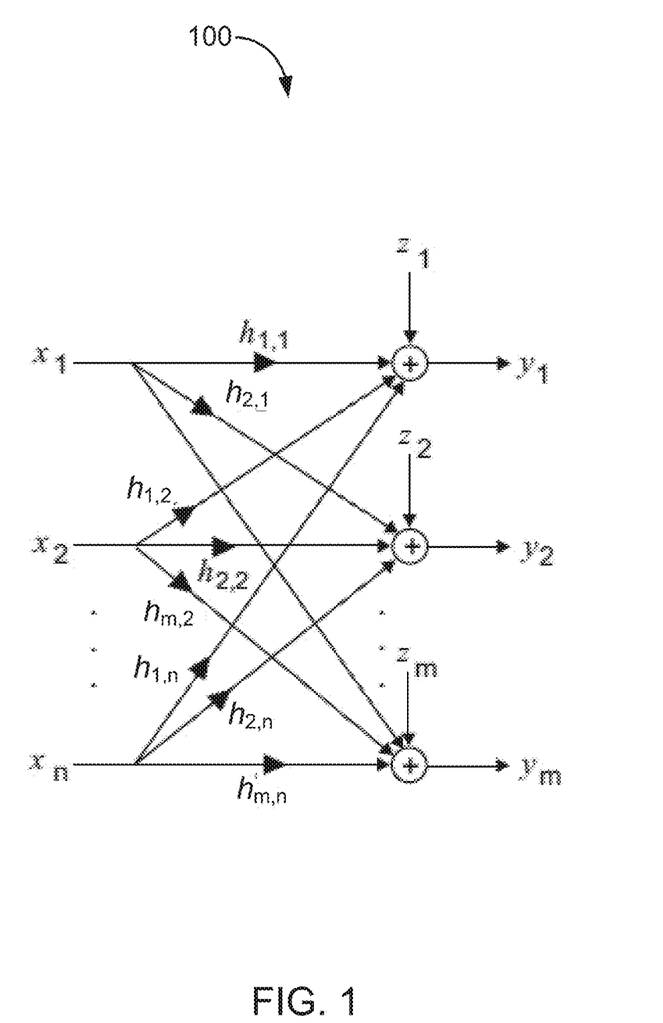
FIG. 1 illustrates a schematic diagram of a MIMO-OFDM channel model.

Referring now to FIG. 1, a schematic diagram of a MIMO-OFDM channel model is described. Wireless signals experience transformations such as amplitude and phase changes while traveling over air from a transmitter to a receiver. For example, a simple model for a wireless channel is:

$$y[t]=h \cdot x[t]+z[t] \quad \text{(Eq. 1)}$$

where t is a time index, y is the received signal, x is the transmitted signal, h is a channel gain, and z is additive noise. More complex models incorporate multipath fading, time-varying channels, multiple antennas, and so on. Coherent receivers require knowledge of the CSI (i.e., h in the simple model in Eq. 1) for successful demodulation. In addition, CSI can also be used for data rate selection, antenna selection, power control and allocation across transmit antennas, etc.

As appreciated by one skilled in the art, CSI can be obtained by using pilot sequences within a data packet. These sequences are predetermined sequences (i.e., they do not carry information) that are sent within the data packet to help the receiver estimate the CSI. For example, in the simple channel model expressed in Eq. 1, setting x=1 in the first k symbols of the data packet allows the receiver to compute:

$$h = \frac{\alpha}{k}\sum_{t=1}^{k} y[t] = \alpha \cdot h + \frac{\alpha}{k}\sum_{t=1}^{k} z[t] \quad \text{(Eq. 2)}$$

where α is a constant chosen according to the signal to noise ratio ("SNR") in the channel.

The 802.11n protocol allows the use of MIMO to obtain improvements in data rate and reliability. In addition, 802.11n uses OFDM modulation to convert a wideband channel into multiple narrowband channels in order to avoid inter-symbol interference ("ISI"). Accordingly, the simple model of Eq. 1 can be extended for a MIMO-OFDM channel as follows:

$$y[w,t]=H[w]x[w,t]+z[w,t] \quad \text{(Eq. 3)}$$

where for n transmit and m receive antennas, x is an n-dimensional vector, y and z are m-dimensional vectors, H is an m×n matrix, and w is an index specifying the OFDM frequency channel.

In MIMO-OFDM systems, the CSI H is an m×n×W data structure, where W is the number of OFDM channels used in the system. For example, in 802.11n systems, W=56 for a 20 MHz bandwidth and W=114 for a 40 MHz bandwidth with channel bonding. It is thus appreciated that W, or the third dimension in the CSI data structure, may be used to indicate the bandwidth of the channel. It is also appreciated that the column index j=1, . . . , n of H[w] indicates the transmit antenna index, while the row index i=1, . . . , m of H[w] indicates the receive antenna index. Further, it is appreciated that channel 100 depicted in FIG. 1 represents one of the W OFDM channels that may be used in a MIMO-OFDM system.

As described in more detail herein below for various embodiments, an m×n×R CSI data structure may be estimated using packets encoded with $m_i \times n_i \times W_i$ schemes, where $R>W_i$ and i is the packet index. That is, CSI data structures obtained from multiple packet transmissions may be used to estimate larger CSI data structures. For example, a 3×2×114 CSI data structure may be obtained by combining the CSI that is derived from two packets transmitted using a 3×2×56 channel configuration, as long as different 20 MHz frequency channels are used in the 20 MHz transmissions. As appreciated by one skilled in the art, 802.11n systems may also require that the 20 MHz frequency channels be adjacent to estimate a combined CSI for the 40 MHz channel.

It is also appreciated that the number of OFDM sub-channels $W_i$ (or the bandwidth of the channel) and the number of transmit antennas $n_i$ may be different for each packet i used to generate a combined CSI estimate. For example, let $W_l$, l=1, 2, 3, be the number of OFDM sub-channels used in the 802.11ac protocol for 20 MHz, 40 MHz and 60 MHz transmissions respectively. Also, let packet 1 be transmitted using a 3×1×$W_1$ configuration, packet 2 be transmitted using a 3×2×$W_1$ configuration, packet 3 be transmitted using a 3×1×$W_2$ configuration, and packet 4 be transmitted using a 3×2×$W_2$ configuration. CSI estimates derived from these four received packets can be extrapolated to generate a combined CSI estimate of dimension 3×3×$W_3$.

Figure 2:
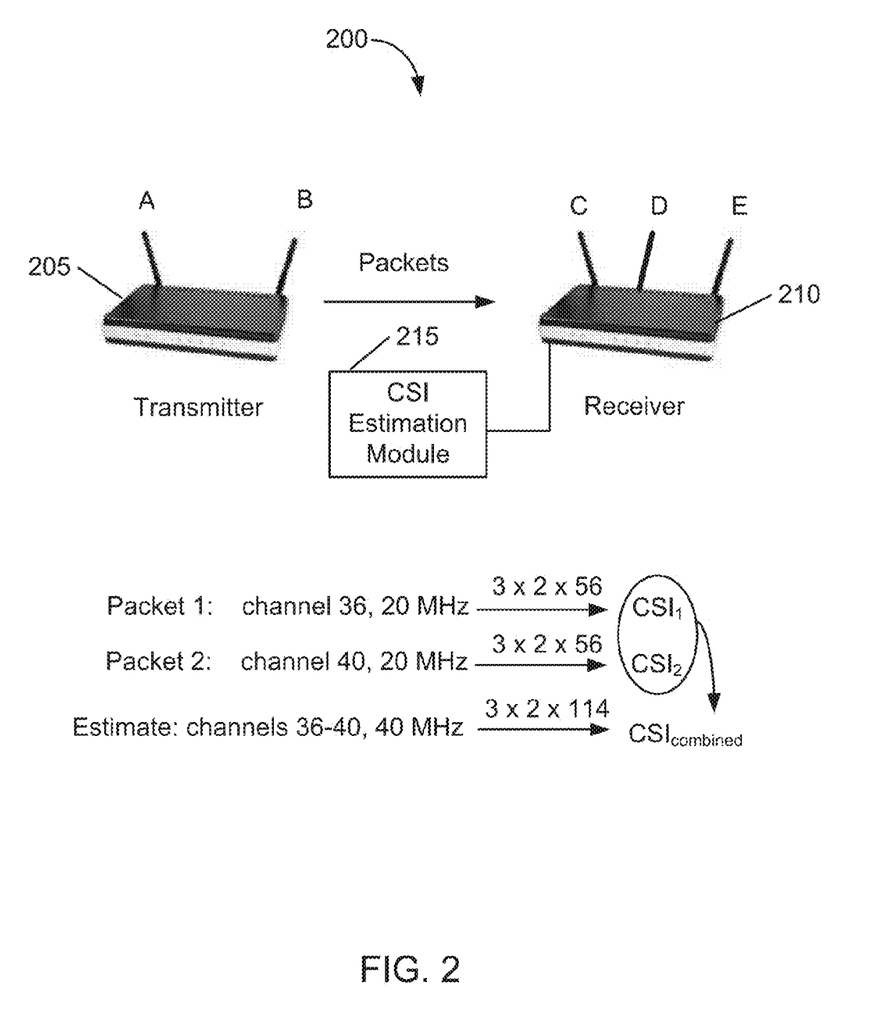
FIG. 2 illustrates an example schematic diagram for estimating a 3×2×114 CSI data structure from two packets transmitted using a 3×2×56 configuration.

FIG. 2 illustrates an example schematic diagram for estimating a 3×2×114 CSI data structure from two packets transmitted using a 3×2×56 configuration. Channel 200 is a MIMO-OFDM channel between a transmitter 205 and a receiver 210. Transmitter 205 has two antennas—antennas A and B—and receiver 210 has three antennas—antennas C, D, and E. To properly characterize the channel 200, packets are sent from the transmitter 205 to the receiver 210. Receiver 210 estimates the CSI using a CSI estimation module 215, which may be implemented in a receiver computing system (shown in FIG. 8) within receiver 210 as hardware, software, or a combination of both.

For example, a packet 1 may be transmitted in the 20 MHz bandwidth channel 36 of 802.11's 5 GHz band, and a packet 2 may be transmitted in the 20 MHz bandwidth channel 40 of 802.11's 5 GHz band. The CSI for these two packet transmissions can be estimated by the receiver 210 in the CSI estimation module 215. These estimates, however, only provide CSI for packet transmissions using a 20 MHz bandwidth. Successful characterization of the channel 200 for a 40 MHz bandwidth requires the estimation of a complete CSI data structure in the CSI estimation module 215, that is, the estimation of a CSI data structure for transmissions using a 40 MHz bandwidth (e.g., with channel bonding).

According to various embodiments, instead of estimating the complete 3×2×114 CSI data structure by sending and receiving packets for every possible channel configuration, the CSI estimates obtained for the packets sent with the subset 3×2×56 channel configuration are extrapolated to estimate a combined 3×2×114 CSI data structure in the CSI estimation module 215. Computation of this combined, extrapolated CSI data structure requires that the packets used to formulate the CSI estimates for the computation be transmitted in different channels (e.g., channels 36 and 40 of the 5 GHz band). As described in more detail herein below, the computation of a combined CSI estimate may also need to take into account the transmission power at the transmitter, e.g., transmitter 205.

As appreciated by one skilled in the art, the CSI estimates that receivers (such as receiver 210) produce are dependent on the transmission power used for the transmitted packet. Assume that the channel gains remain constant during the transmission of two packets (e.g., packets 1 and 2 of FIG. 2) and that $P_2=\gamma P_1$, where $P_i$ is the transmission power of packet i, i={1, 2} and γ is a scale factor. Then:

$$CSI_2 = \sqrt{\gamma} CSI_1 \quad \text{(Eq. 4)}$$

where $CSI_i$ is the CSI estimate produced for packet i. If transmission power is constant, then the combined CSI estimate does not need to explicitly depend on it.

Due to regulations and practical limitations, there is a total power constraint for the transmitted signal. When the transmission spans multiple transmit antennas, assuming that the signals in the different antennas and OFDM sub-channels are statistically independent, the total transmitted power is given by:

$$P = \sum_{w=1}^{W} \sum_{i=1}^{n} P_i[w] \quad \text{(Eq. 5)}$$

where $P_i[w]$ is the power in the signal transmitted in antenna i, i=1, n and frequency sub-channel w, w=1, . . . , W. In order to meet the total power constraint, $P_i[w]$ may vary for different configurations with different bandwidths or number of transmit antennas.

These power considerations have important implications for the computation of a combined CSI estimate. Referring to Eq. 3, since the transmission powers may not be known at the receiver, the CSI estimate for entry (i,j) in sub-channel w of the channel matrix H may be an estimate of $H_{i,j}[w]\sqrt{P_j[w]}$. Since $P_j[w]$ may vary for communication schemes involving different number of transmit antennas and different transmission bandwidths, the CSI estimates used in the computation of the combined CSI estimate must be appropriately scaled.

In various embodiments, it is assumed herein that the same transmission power is used in each transmit antenna and frequency sub-channel. Let $P_i$ be an estimate generated at the receiver of the power used in each transmit antenna and frequency sub-channel for packet i. This estimate may use information provided in metadata included in the packet, information exchanged in a separate control channel, or information acquired during association. Let f be a function that combines CSI derived from k packets to generate a new, possibly larger CSI structure. In order to deal with the power scaling explicitly, it is assumed that f does not perform any power scaling.

In this case, the combined CSI can be computed using $(\sqrt{P} f(CSI_1/\sqrt{P_1}, \ldots, CSI_k/\sqrt{P_k})$, where P is the power transmitted in each antenna in each frequency sub-channel in the communication scenario in which the combined CSI is to be used. For example, if the combined CSI is to be used for a communication scheme that sends data over 3 transmit antennas over a 20 MHz bandwidth with equal power in each antenna and each frequency sub-channel with total transmit power $\overline{P}$, then $P=\overline{P}/(56 \times 3)$.

It is appreciated that in most WLAN deployments, dynamic transmission power is used in combination with rate control to reduce power consumption. Commodity hardware allows the user to choose a transmission power level. If the transmitted power closely follows the level chosen by the user, a power scaling factor can be applied to the CSI of a packet transmitted at a specific power level to estimate the CSI of a different power level. For example, if a packet sent at 7 dBm is received, the CSI for a transmission with the same antenna configuration at 5 dBm can be estimated by subtracting 1 dB (i.e., (7−5)/2 dB) from the magnitude of the original CSI.

However, practical limitations influence the power control capabilities of real transceivers. Power amplifiers are not perfectly linear, producing increasing distortion as they are driven closer to their maximum rated power. The distortion introduced by the transmitter amplifiers has a bigger impact on Modulation and Coding Schemes ("MCS") with larger coding rates and higher order modulations. As a result, many transceivers limit the output power used for high rate MCSs through various power caps. As thus appreciated by one skilled in the art, an accurate power profiling can prevent two erroneous outcomes in the CSI estimation procedure. First, when using the CSI derived from a packet with a specific MCS to estimate the CSI of a different MCS, not being aware of the power caps might introduce estimation errors. This happens not only when combining CSI to produce estimates for a different number of streams, but also when using the CSI from a given MCS to estimate the CSI for some other MCS with the same number of streams. Additionally, this information must be considered when estimating the effect of power adaptation. For example, scaling the normal transmission power from 10 dBm to 15 dBm has no effect in the actual transmitted power (and power consumption) in MCS7 in some transceiver implementations.

Therefore, it is appreciated that to accurately apply power scaling, two pieces of information may be required: (1) the power profile for the specific hardware installed in the transmitter. This information can be hardcoded in the receiver or sent on demand by the transmitter. (2) The power level at which each packet is sent. This information can be specified explicitly by the transmitter with a specific control packet, or attached to data packets, or inferred from the packet type (e.g., beacons are generally transmitted at the lowest data rate and the highest power level).

It is also appreciated that the 802.11n standard provides an optional feature called staggered sounding by which the training sequence in the packet header is transmitted over more streams than those used in the payload of the packet. This feature enables a larger CSI structure to be estimated without risking a decoding error in the payload of the packet. However, being an optional feature, it may not be supported across various chipset vendors. In addition, it does not allow estimating CSI structures for larger bandwidth than that used for the given packet. Finally, it is not supported during beacon transmissions, hence it cannot be used in applications such as AP selection during association. When staggered sounding is supported it can be used jointly with the embodiments described herein to further reduce the number of samples required to obtain a complete knowledge of the MIMO channel.

Figure 3:
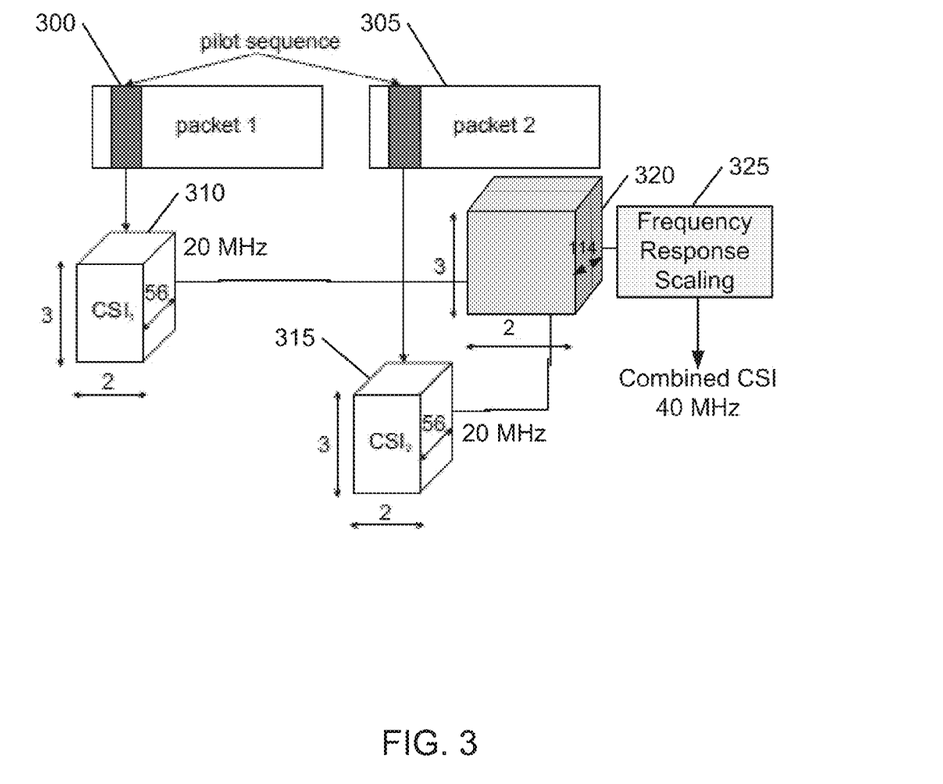
FIG. 3 illustrates an example schematic diagram of operations used to generate a combined 3×2×114 CSI estimate from two packets sent and received with a 3×2×56 channel configuration.

Attention is now directed at FIG. 3, which illustrates a schematic diagram of operations used to generate a combined 3×2×114 CSI estimate for a 40 MHz channel based on two packets sent and received with 3×2×56, 20 MHz channels. The CSI estimate provided by the receiver (e.g., receiver 210) may be influenced by the frequency response of the various radio frequency ("RF") filters in the wireless signal path, both at the transmitter (e.g., transmitter 205) and the receiver (e.g., receiver 210). When extrapolating CSI estimates obtained from 20 MHz transmissions to generate a combined CSI estimate corresponding to a 40 MHz bandwidth, an additional filtering step may be required to compensate for the different frequency responses of the 20 MHz and 40 MHz filters.

Let w identify the sub-channels corresponding to the same physical signal frequency in both 20 MHz and 40 MHz transmissions. A packet 1 300 is transmitted in a 20 MHz channel (e.g., channel 36 of the 5 GHz band) and the CSI 310 is estimated by the receiver using its CSI estimation module (e.g., the CSI estimation module 215 in receiver 210). Similarly, a packet 2 305 is transmitted in a different 20 MHz channel (e.g., channel 40 of the 5 GHz band) and the CSI 315 is estimated by the receiver using its CSI estimation module (e.g., the CSI estimation module 215 in receiver 210). A combined CSI estimate 320 is then generated by merging the CSI estimates 310 and 315 with the appropriate power scaling. As appreciated by one skilled in the art, the CSI estimates 310 and 315 are merged to form the larger data structure corresponding to the combined CSI estimate 320 for a higher bandwidth channel.

The combined CSI estimate 320 is then scaled by the frequency responses of the transmit and receive filters (325). Let $F_{20}[w] \in \mathbb{C}$ and $F_{40}[w] \in \mathbb{C}$ be the overall frequency response of the transmit and receive filters at frequency sub-channel w for 20 MHz and 40 MHz transmissions, respectively. Let $\hat{H}[w]$ denote the combined CSI estimate 320. A new estimate $\hat{H}'[w]$ may be formed by scaling $\hat{H}[w]$ in 325 to compensate for the different frequency responses of the 20 MHz and 40 MHz filters, that is:

$$\hat{H}'[w] = \hat{H}[w] \cdot F_{40}[w]/F_{20}[w] \quad \text{(Eq. 6)}$$

In practice, $F_{20}[w]$ and $F_{40}[w]$ may need to be known at the receiver estimating the combined CSI estimate 320. One approach may characterize these frequency responses for the various 802.11n chipsets, store this information in the receiver, and identify the transmit/receive chipset combination during association or during data transmission (e.g., using metadata in the packet, MAC address, and so on). A second approach may learn these frequency responses through transmissions in different partially overlapping frequency channels.

Figure 4:
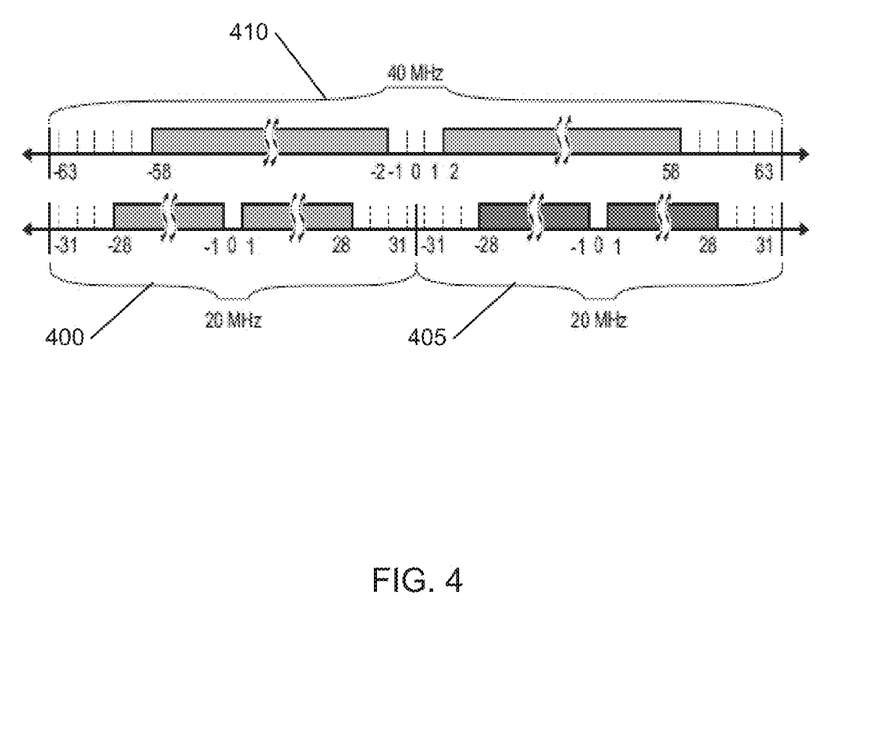
FIG. 4 illustrates example sub-channels used in 2×20 MHz transmissions in adjacent frequency channels and example sub-channels used in a 40 MHz transmission.

Example sub-channels used in 2×20 MHz transmissions in adjacent frequency channels and example sub-channels used in a 40 MHz transmission are illustrated in FIG. 4. The sub-channels that are not shown as shaded in the figure are not used (the sub-channel numbers follow the 802.11n standard's convention). It is appreciated that, in this example, combining CSI estimates from the two 2×20 MHz transmissions 400-405 does not directly provide CSI for six 40 MHz sub-channels: ±2, ±3, and ±32. In these cases, the CSI estimates from available (such as the nearest available) sub-channels may be interpolated to form CSI estimates for the missing CSI estimates. For example, $\hat{H}_{i,j}[32]$ may be estimated using $\hat{H}_{i,j}[31]$ and $\hat{H}_{i,j}[33]$ by computing:

$$\hat{H}_{i,j}[32] = (\hat{H}_{i,j}[31] + \hat{H}_{i,j}[33])/2 \quad \text{(Eq. 7)}$$

Similarly, for the sub-channels $w \in \{-3, -2, 2, 3\}$, the following estimate may be computed:

$$\hat{H}_{i,j}[w] = \hat{H}_{i,j}[-4] + (\hat{H}_{i,j}[4] - \hat{H}_{i,j}[-4]) \cdot (w+4)/8 \quad \text{(Eq. 8)}$$

More generally, other sophisticated functions may be used to obtain combined CSI estimates, possibly by using CSI from other sub-channels.

Figure 5:
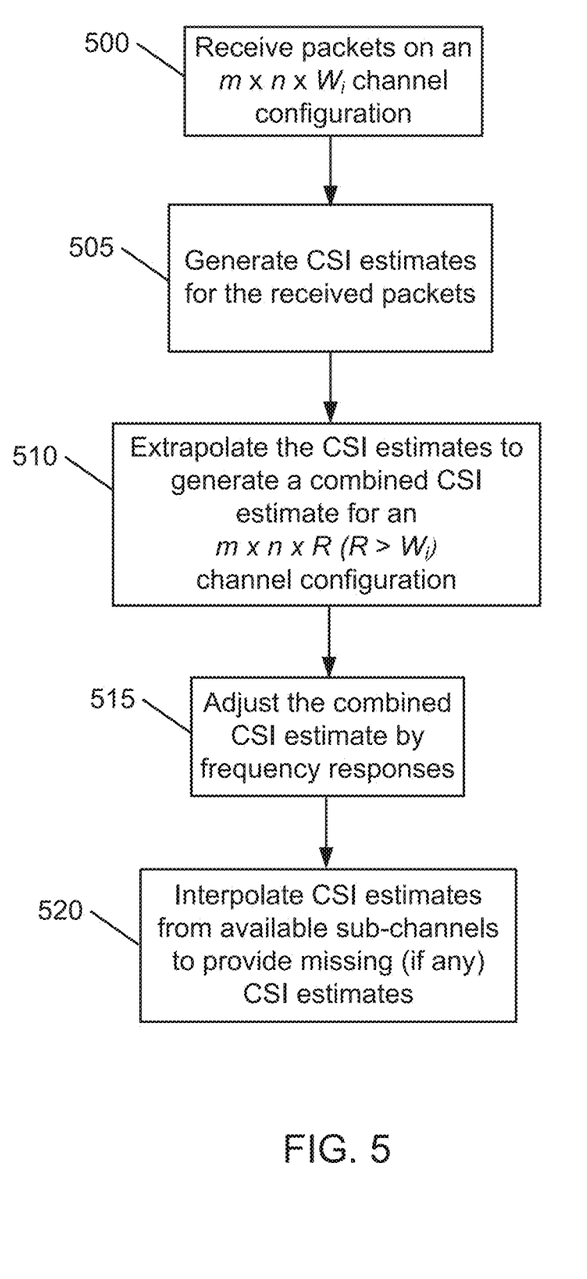
FIG. 5 is a flowchart for estimating the combined m×n×R, 40 MHz CSI of FIG. 3 using estimates from two packets sent and received with a m×n×$W_i$, 20 MHz channel configuration.

The operations described above are shown in a flowchart illustrated in FIG. 5. First, packets (indexed by i) are received for an m×n×$W_i$ channel configuration for a given bandwidth channel, e.g., 20 MHz (500). CSI estimates are then generated for the received packets (505). Next, the CSI estimates for the received packets are extrapolated to generate a combined CSI estimate for an m×n×R channel configuration, where R>$W_i$ (510), e.g., for a 40 MHz channel. The combined CSI estimate is then adjusted by the frequency responses of the 20 MHz and 40 MHz filters at the transmitter and receiver (515). An optional interpolation step may be implemented to interpolate estimates from available sub-channels to form any missing CSI estimates (520).

It is appreciated that bonding of two adjacent channels is allowed in 802.11n to increase the bandwidth, and the new 802.11ac standard allows bonding of non-adjacent channels up to a bandwidth of 160 MHz. The new 802.11ac standard is exploring the option of using up to eight 20 MHz possibly non-adjacent channels for the channel bonding feature. In one 802.11ac standard bonding scheme, there are a total of 44 possible channel combinations, which a brute-force probing-based mechanism should investigate individually. Using the channel estimation mechanism described herein (i.e., combining CSI estimates for a lower bandwidth channels to generate a CSI estimate for a higher bandwidth channel), only eight samples are necessary, one per 20 MHz channel, to compute a complete characterization of all the possible channel bonding combinations.

In addition, as is further detailed in the co-pending related International Patent Application No. PCT/US2011/053149 herein incorporated by reference, a combined CSI estimate may also be generated by extrapolating CSI estimates from multiple packets sent over different antennas. In a more general case, a combined CSI estimate may be generated by extrapolating CSI estimates from multiple packets sent over both different antennas as well as different frequency channels. The number of packets that may be required to generate a combined CSI estimate in this case depends on the channel configuration and the desired dimensions of the combined CSI estimate.

Figure 6:
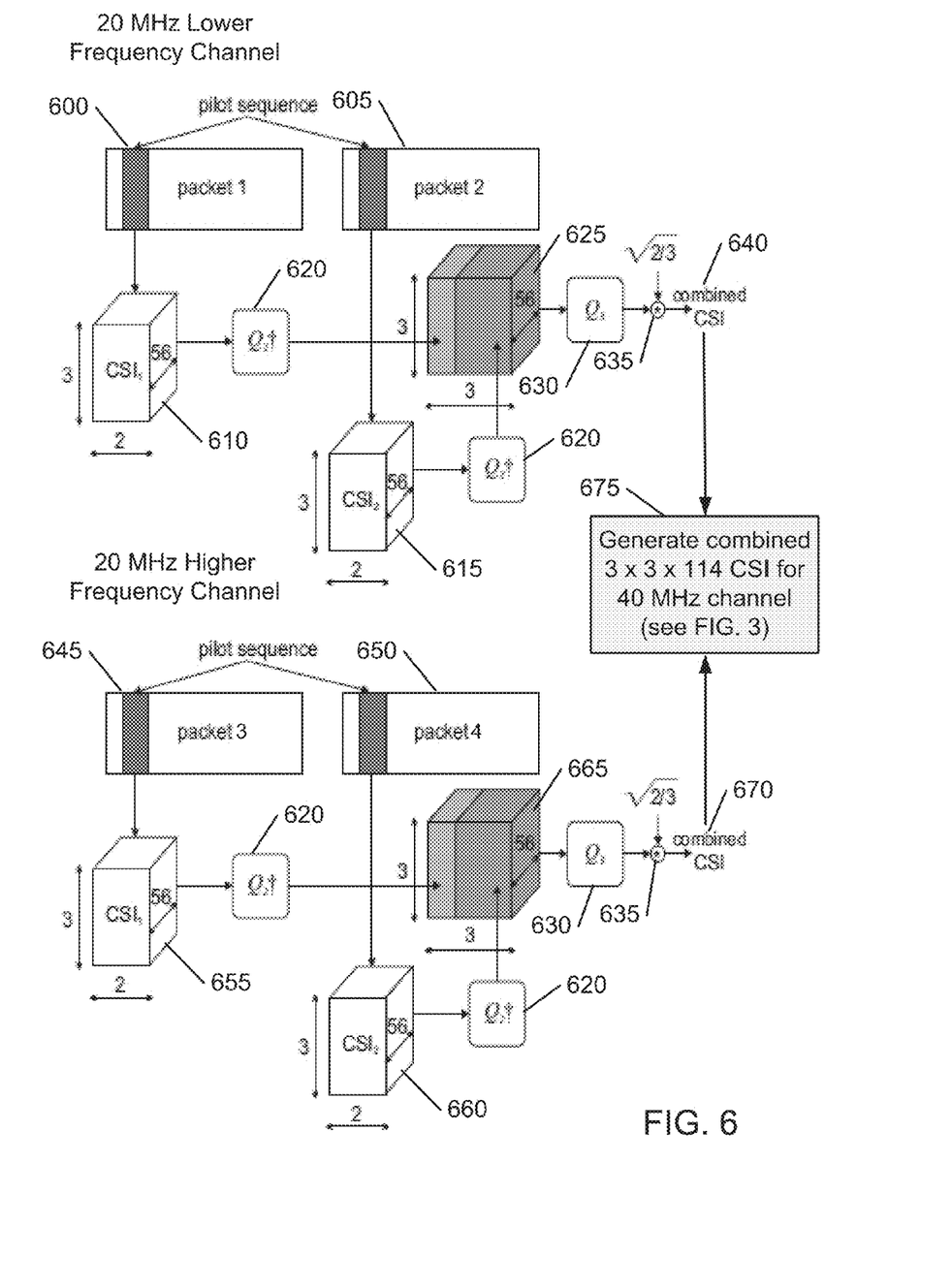
FIG. 6 illustrates a schematic diagram of example operations used to generate a combined 3×3×114 CSI estimate from four packets sent and received with a 3×2×56 channel configuration over different antennas and different frequency channels.

For example, to generate a 3×3×114 (40 MHz) CSI estimate using packets transmitted over different 20 MHz channels and different antennas in 3×2×56 configurations, one would need four packets: two packets per each frequency channel or antenna set. The combined CSI estimate may be generated by first combining two packets in each frequency channel in a 3×2×56 configuration to generate a 3×3×56 CSI estimate for each channel and then combine the two 3×3×56 CSI estimates for the two channels to generate a combined 3×3×114 CSI estimate, as illustrated in FIG. 6. Alternatively, as show in FIG. 7, two packets sent over a given antenna set (with each packet in a different frequency 3×2×56, 20 MHz channel) may be used to generate a 3×2×114 CSI estimate for a 40 MHz channel, and another two packets sent over a different antenna set (with each packet also in a different frequency 3×2×56, 20 MHz channel) may be used to generate another 3×2×114 CSI estimate. The two 3×2×114 CSI estimates over the two different antenna sets may then be combined to generate a 3×3×114 CSI estimate.

Figure 7:
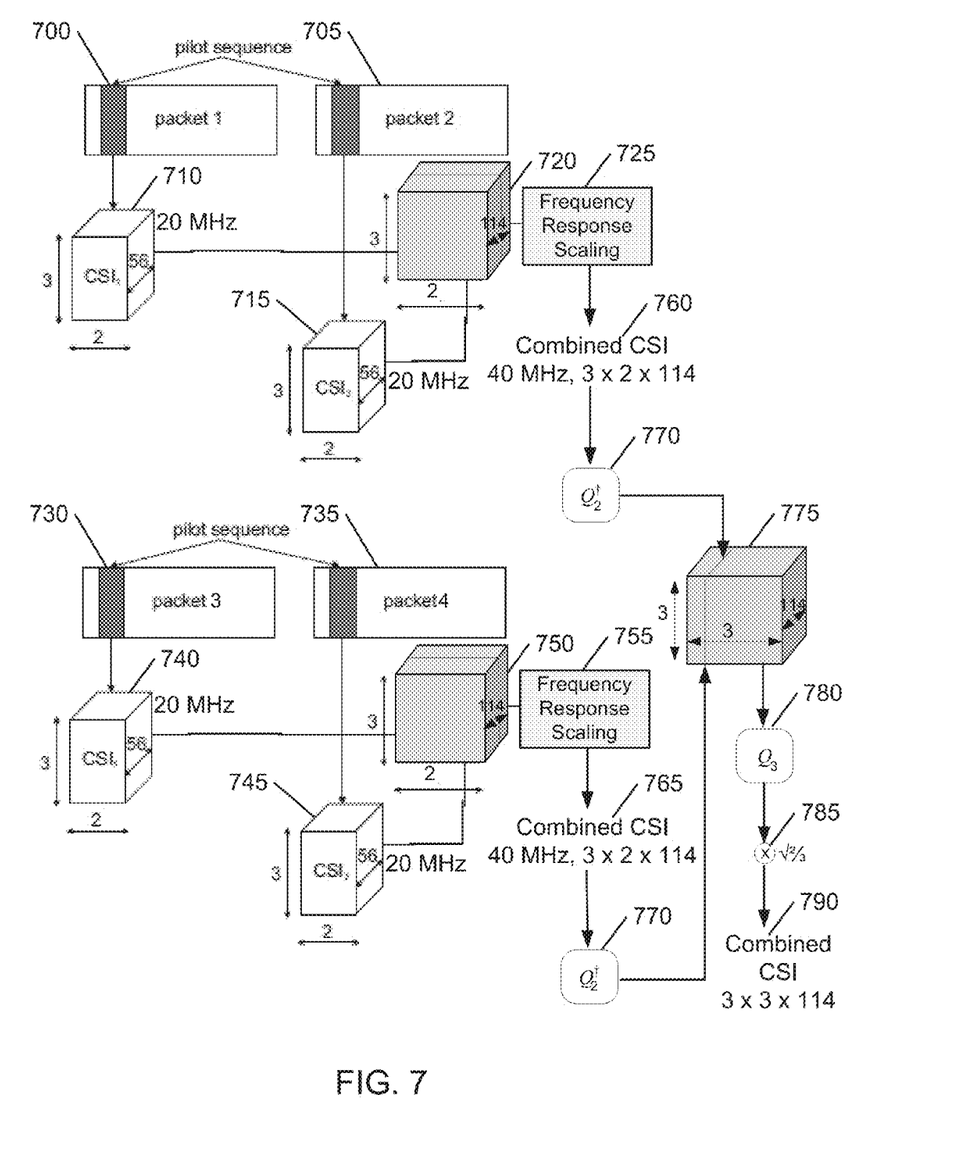
FIG. 7 illustrates a schematic diagram of another example operations used to generate a combined 3×3×114 CSI estimate from four packets sent and received with a 3×2×56 channel configuration over different antennas and different frequency channels.

As appreciated by one skilled in the art, the approaches illustrated in FIGS. 6-7 are shown for illustration purposes only. Other approaches for extrapolating CSI estimates for received packets to generate a combined CSI estimate may also be implemented for the same or different channel configurations.

Referring now to FIG. 6, a schematic diagram of operations used to generate a combined 3×3×114 CSI estimate from four packets sent and received with a 3×2×56 channel configuration over different antennas and different frequency channels is described. Let packet 1 600 be transmitted with $N_1 = \{1, 2\}$ antennas over a lower frequency 20 MHz channel (e.g., channel 36) and packet 2 605 be transmitted in the same channel with $N_2 = \{2, 3\}$ antennas for a MIMO-OFDM system having a set N of transmit antennas with N={1, 2, 3}. Similarly, let packet 3 645 be transmitted with $N_1 = \{1, 2\}$ antennas over a higher frequency 20 MHz channel (e.g., channel 40) and packet 4 650 be transmitted in the same channel with $N_2=\{2, 3\}$ antennas.

After successful reception of packet i, i=1, 2, 3, 4 the receiver (e.g., receiver 210 of FIG. 2) generates CSI estimates for sub-channels w=1, 2, ..., 56, $\hat{H}_i[w]$, where i=1, 2 for the lower frequency channel and i=3, 4 for the higher frequency channel. The CSI estimates may be dependent on the transmission power in each antenna and each frequency sub-channel. For example, the receiver generates the CSI estimate 610 after reception of packet 1 600 and the CSI estimate 615 after reception of packet 2 605. Likewise, the receiver generates the CSI estimate 655 after reception of packet 3 645 and the CSI estimate 660 after reception of packet 4 650. The CSI estimates 610 and 615 as well as the CSI estimates 645 and 650 are then multiplied by the conjugate transpose $Q_2^\dagger$ 620 of the precoding matrix $Q_2$, resulting in:

$$\hat{H}'_i[w]=\hat{H}_i[w] \cdot Q_2^\dagger=[\hat{h}_{1,i}[w],\hat{h}_{2,i}[w]] \quad \text{(Eq. 9)}$$

where $\hat{h}_{j,i}[w] \in \mathbb{C}^2$, i=1, 2, 3, 4, j=1, 2, and w=1, 2, ..., 56.

The combined CSI estimates 640 ($\hat{H}_3^L[w]$) and 670 ($\hat{H}_3^H[w]$) for sub-channel w, after power scaling 635 and accounting for precoding 630, may therefore be given by:

$$\hat{H}_3^L[w]=\sqrt{2/3} \cdot [\hat{h}_{1,1}[w],\hat{h}_{1,2}[w],\hat{h}_{2,2}[w]] \cdot Q_3 \quad \text{(Eq. 10a)}$$

$$\hat{H}_3^H[w]=\sqrt{2/3} \cdot [\hat{h}_{1,3}[w],\hat{h}_{1,4}[w],\hat{h}_{2,4}[w]] \cdot Q_3 \quad \text{(Eq. 10b)}$$

As appreciated by one skilled in the art, both $\hat{h}_{2,1}[w]$ (resp. $\hat{h}_{2,3}[w]$) and $\hat{h}_{1,2}[w]$ (resp. $\hat{h}_{1,4}[w]$) contain CSI that can be used to generate $\hat{H}_3^L[w_k]$ (resp. $\hat{H}_3^H[w_k]$). However, only $\hat{h}_{1,2}[w]$ (resp. $\hat{h}_{1,4}[w]$) is used in the combined CSI estimate in Eq. 10a (resp. Eq. 10b) due to the fact that wireless channels often experience variations over time and the most recent CSI is often the most suitable to make future estimates.

It is appreciated that more general combining functions can be used to balance the effects of channel variations and channel estimation errors due to, e.g., noise. One such example is:

$$\hat{H}_3^L[w]= \sqrt{2/3} \cdot [\hat{h}_{1,1}[w],(\beta\hat{h}_{1,2}[w]+(1-\beta)\hat{h}_{2,1}[w]),\hat{h}_{2,2}[w]] \cdot Q_3 \quad \text{(Eq. 11a)}$$

$$\hat{H}_3^H[w]= \sqrt{2/3} \cdot [\hat{h}_{1,3}[w],(\beta\hat{h}_{1,4}[w]+(1-\beta)\hat{h}_{2,3}[w]),\hat{h}_{2,4}[w]] \cdot Q_3 \quad \text{(Eq. 11a)}$$

where $\beta \in [0,1]$ is some constant chosen appropriately and $Q_3$ is the precoding matrix used for the 3×3×56 channel configuration.

Now as described above with reference to FIG. 3, to generate a combined CSI estimate for a 40 MHz channel, the combined CSI estimates 640 and 670 are merged (with the appropriate power scaling) to generate a CSI estimate 675 for a 40 MHz channel. Let $\hat{H}[w]$ denote the combined CSI estimate 675. A new estimate $\hat{H}'[w]$ may be formed by scaling $\hat{H}[w]$ to compensate for the different frequency responses of the 20 MHz and 40 MHz filters, that is:

$$\hat{H}'[w]=\hat{H}[w] \cdot F_{40}[w]/F_{20}[w] \quad \text{(Eq. 12)}$$

In practice, $F_{20}[w]$ and $F_{40}[w]$ may need to be known at the receiver estimating the combined CSI estimate 675. One approach may be to characterize these frequency responses for the various 802.11n chipsets, store this information in the receiver, and identify the transmit/receive chipset combination during association or during data transmission (e.g., using metadata in the packet, MAC address, and so on). A second approach may be to learn these frequency responses through transmissions in different partially overlapping frequency channels.

It is appreciated that the 3×3×114 channel configuration of the combined CSI estimate 675 is used herein for purposes of illustration; a combined CSI estimate may be extrapolated for multiple channel state configurations using packets of subset configurations, for example a combined CSI estimate may be derived for any m×q×R channel configuration using CSI estimates obtained from packets received with m×$n_i$×$W_i$ channel configurations, where q>$n_i$ and R>$W_i$.

Referring now to FIG. 7, a schematic diagram of other example operations used to generate a combined 3×3×114 CSI estimate from four packets sent and received with a 3×2×56 channel configuration over different antennas and different frequency channels for a MIMO-OFDM system with N={1, 2, 3} transmit antennas is described. Let packet 1 700 be transmitted with $N_1=\{1, 2\}$ antennas over a lower frequency 20 MHz channel (e.g., channel 36) and packet 2 705 be transmitted with the same antennas but at a higher frequency 20 MHz channel (e.g., channel 40). A combined 3×2×114 CSI estimate 760 for a 40 MHz channel may be generated by following the operations described above with reference to FIG. 3. Similarly, let packet 3 730 be transmitted with $N_2=\{2, 3\}$ antennas over a lower frequency 20 MHz channel (e.g., channel 36) and packet 4 735 be transmitted with the same antennas but at a higher frequency 20 MHz channel (e.g., channel 40). Another combined 3×2×114 CSI estimate 765 for a 40 MHz channel may be generated by following the operations described above with reference to FIG. 3.

Now to take into account the different antennas used for packets 1-2 and packets 3-4, the two 3×2×114 CSI estimates 760-765 may be combined to generate a 3×3×114 CSI estimate 790. In doing so, the precoding matrix and power scaling need to be considered as described above with reference to FIG. 6. Each 3×2×114 CSI estimate 760-765 is first adjusted by a precoding matrix 770 for the 3×2×114 channel configuration to generate a combined 3×3×114 CSI estimate 775. This combined 3×3×114 CSI estimate 775 is then adjusted by the precoding matrix 780 for the 3×3×114 channel configuration and a power scaling 785 is applied to generate the combined 3×3×114 CSI estimate 790 for the 40 MHz channel over the different antennas.

Figure 8:
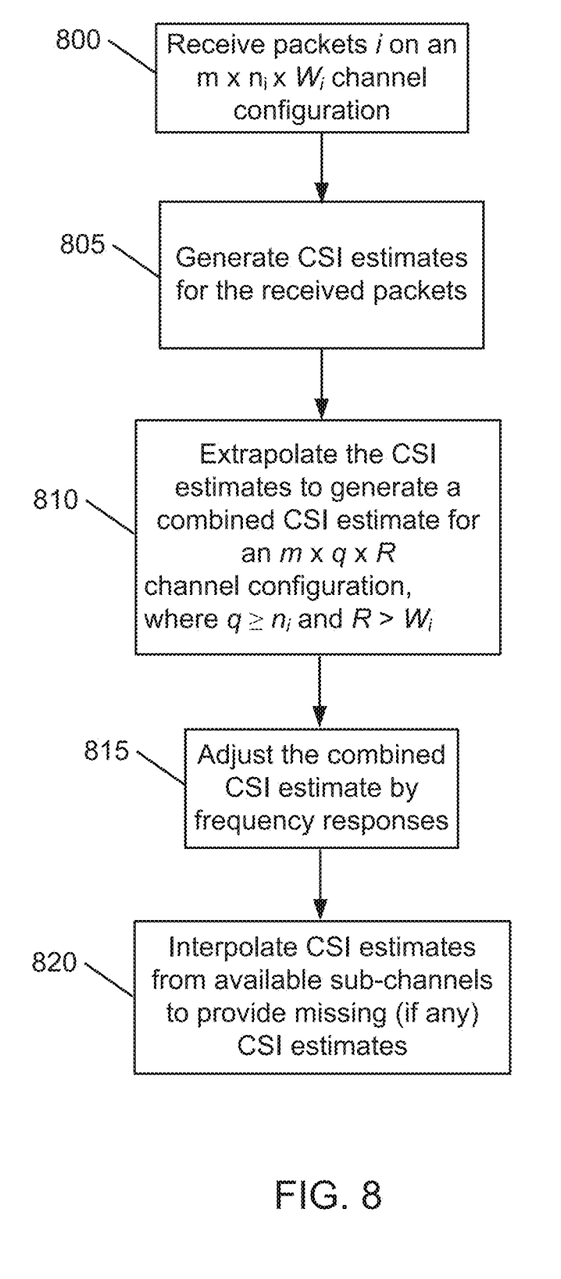
FIG. 8 is a flowchart for estimating the combined 3×3×114, 40 MHz CSI of FIG. 6 using estimates from four packets sent and received with a 3×2×56, 20 MHz channel configuration.

Attention is now directed to FIG. 8, which shows a flowchart illustrating the operations described in FIG. 6 above. First, packets are received for an m×$n_i$×$W_i$ channel configuration in a lower frequency channel and in a higher frequency channel (800). Next, CSI estimates are generated for the received packets (805). The CSI estimates generated for the received packets are then extrapolated to form a combined CSI estimate for an m×q×R channel configuration, where q>$n_i$ and R>$W_i$ (810). The combined CSI estimate is formed by merging the CSI estimates for the received packets in the lower and higher frequency channels after they are adjusted to account for the channel precoding matrix and for the power transmitted in each antenna as described above with reference to Eqs. 10a and 10b. The combined CSI estimate is then adjusted by the frequency responses of the 20 MHz and 40 MHz filters at the transmitter and receiver (815). An optional interpolation step may be implemented to interpolate estimates from available sub-channels to form CSI estimates for any missing CSI after combining (820).

Advantageously, estimating a combined CSI for an m×q×R channel configuration using CSI estimates obtained from packets received with a m×$n_i$×$W_i$ channel configuration can save time and bandwidth by not requiring the transmission and sampling of a sounding packet for the various MIMO channel states. Further, the combined CSI can be used to improve the performance of various network algorithms such as rate adaptation, beamforming, and association control, among others, and be used for channel bonding, such as for bonding two or more narrower channels which have been sampled independently.

Figure 9:
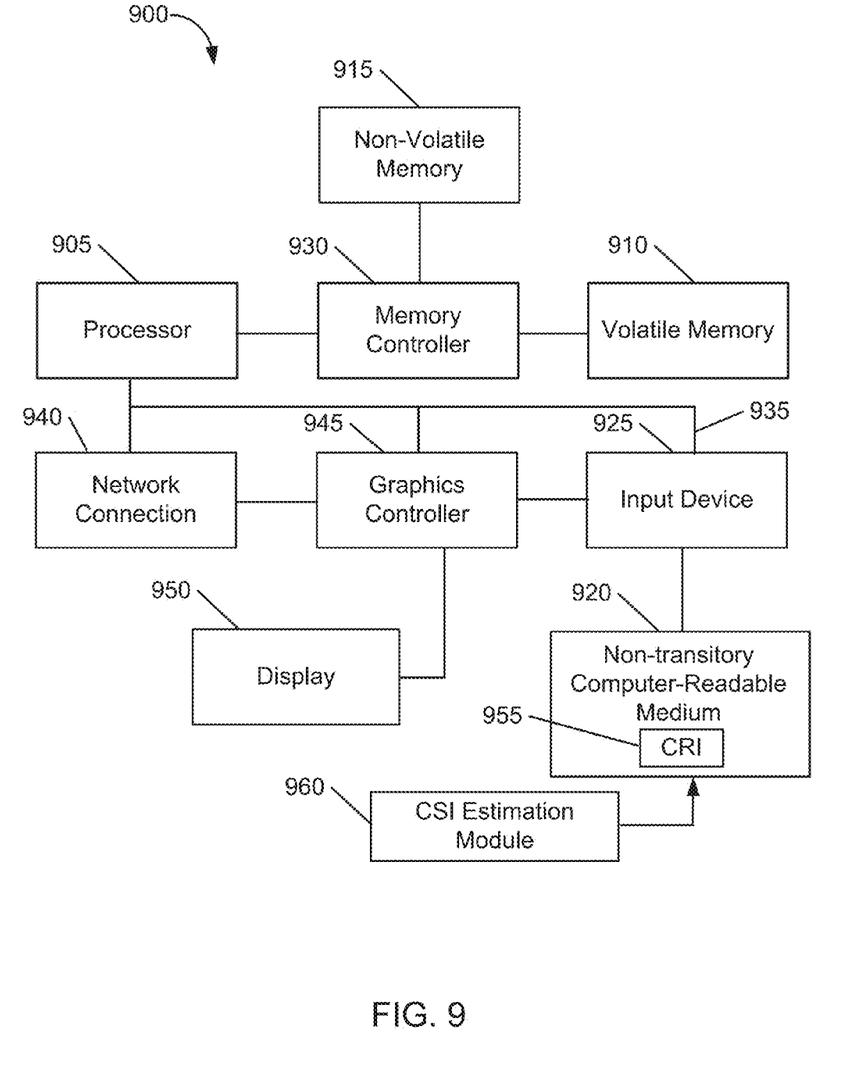
FIG. 9 is a block diagram of an example receiver computing system for estimating a combined CSI according to the present disclosure.

As described above, the combined CSI may be computed in a CSI estimation module (e.g., CSI estimation module 215 in FIG. 2) implemented in hardware, software, or a combination of both. Referring now to FIG. 9, a block diagram of an example receiver computing system for estimating a combined CSI according to the present disclosure is described. The receiver computing system 900 (e.g., a sensor node, a desktop computer, a laptop, a multi-core processing system, etc.) can include a processor 905 and memory resources, such as, for example, the volatile memory 910 and/or the non-volatile memory 915, for executing instructions stored in a tangible non-transitory medium (e.g., volatile memory 910, non-volatile memory 915, and/or computer readable medium 920) and/or an application specific integrated circuit ("ASIC") including logic configured to perform various examples of the present disclosure.

A machine (e.g., a computing device) can include and/or receive a tangible non-transitory computer-readable medium 920 storing a set of computer-readable instructions (e.g., software) via an input device 925. As used herein, the processor 905 can include one or a plurality of processors such as in a parallel processing system. The memory can include memory addressable by the processor 905 for execution of computer readable instructions. The computer readable medium 920 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 915 can be a local or remote database including a plurality of physical non-volatile memory devices.

The processor 905 can control the overall operation of the receiver computing system 900. The processor 905 can be connected to a memory controller 930, which can read and/or write data from and/or to volatile memory 910 (e.g., RAM). The memory controller 930 can include an ASIC and/or a processor with its own memory resources (e.g., volatile and/or non-volatile memory). The volatile memory 910 can include one or a plurality of memory modules (e.g., chips). The processor 905 can be connected to a bus 935 to provide communication between the processor 905, the network connection 940, and other portions of the receiver computing system 900. The non-volatile memory 915 can provide persistent data storage for the receiver computing system 900. Further, the graphics controller 945 can connect to a display 950.

Each receiver computing system 900 can include a computing device including control circuitry such as a processor, a state machine, ASIC, controller, and/or similar machine. Each receiver computing system 900 can also include one or more VMs (not shown), and have a hypervisor to manage the VMs. As used herein, the indefinite articles "a" and/or "an" can indicate one or more than one of the named object. Thus, for example, "a processor" can include one processor or more than one processor, such as in a parallel processing arrangement.

The control circuitry can have a structure that provides a given functionality, and/or execute computer-readable instructions that are stored on a non-transitory computer-readable medium (e.g., the non-transitory computer-readable medium 920). The non-transitory computer-readable medium 920 can be integral, or communicatively coupled, to a computing device, in either a wired or wireless manner. For example, the non-transitory computer-readable medium 920 can be an internal memory, a portable memory, a portable disk, or a memory located internal to another computing resource (e.g., enabling the computer-readable instructions to be downloaded over the Internet).

The non-transitory computer-readable medium 920 can have computer-readable instructions 955 stored thereon that are executed by the processor 905 to implement a CSI estimation module 960 according to the present disclosure. The non-transitory computer-readable medium 920, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 920 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular computing system configuration, such as receiver computing system 900.

Those of skill in the art would further appreciate that the various illustrative modules and steps described in connection with the embodiments disclosed herein may be implemented as electronic hardware, computer software, or combinations of both. For example, the example steps of FIGS. 5 and 8 may be implemented using software modules, hardware modules or components, or a combination of software and hardware modules or components. Thus, in one embodiment, one or more of the example steps of FIGS. 5 and 8 may comprise hardware modules or components. In another embodiment, one or more of the steps of FIGS. 5 and 8 may comprise software code stored on a computer readable storage medium, which is executable by a processor.

To clearly illustrate this interchangeability of hardware and software, various illustrative components, blocks, modules, and steps have been described above generally in terms of their functionality (e.g., the CSI estimation module 215). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method for extrapolating channel state information ("CSI") estimates from multiple packets sent over different frequency channels to generate a combined CSI estimate for a multiple input, multiple output orthogonal frequency division multiplexing (MIMO-OFDM) system, the method comprising:

receiving packets on an m×n×$W_i$ channel configuration, wherein m is a number of receive antennas used to receive the packets, n is a number of transmit antennas used to transmit the packets, and $W_i$ is a number of OFDM channels for packet i in the MIMO-OFDM system;

generating, by a processor, CSI estimates for the received packets;

extrapolating, by the processor, the CSI estimates for the received packets to generate a combined CSI estimate for an m×n×R channel configuration, wherein R>$W_i$; and adjusting, by the processor, the combined CSI estimate by frequency responses of transmit and receive filters in the MIMO-OFDM system.

2. The method of claim 1, wherein generating CSI estimates for the received packets comprises computing an m×n×$W_i$ CSI matrix for each received packet.

3. The method of claim 2, wherein extrapolating the CSI estimates for the received packets to generate a combined CSI estimate comprises merging the m×n×$W_i$ CSI matrix for each received packet to form a combined m×n×R CSI estimate in an m×n×R combined CSI matrix, wherein R>$W_i$.

4. The method of claim 3, further comprising power scaling values in the m×n×$W_i$ CSI matrices for each received packet before their merging.

5. The method of claim 1, further comprising interpolating the CSI estimates from available sub-channels to form missing CSI estimates.

6. A receiver for use in a multiple input, multiple output orthogonal frequency division multiplexing (MIMO-OFDM) system to extrapolate channel state information ("CSI") estimates from multiple packets sent over different frequency channels to generate a combined CSI estimate, the receiver comprising:

a processor; and a non-transitory computer readable medium storing instructions that, when executed by the processor, cause the processor to generate a combined CSI estimate for an m×n×R channel configuration by extrapolating CSI estimates generated from packets received with an m×n×$W_i$ channel configuration, wherein m is a number of receive antennas used to receive the packets, n is a number of transmit antennas used to transmit the packets, and $W_i$ is a number of OFDM channels for packet i in the MIMO-OFDM system, i denotes a packet index and R>$W_i$, and wherein the processor is to interpolate the CSI estimates from available sub-channels to form missing CSI estimates.

7. The receiver of claim 6, wherein, to generate the combined CSI estimate for the m×n×R channel configuration, the processor is to merge the CSI estimates computed for the packets received with the m×n×$W_i$ channel configuration.

8. The receiver of claim 7, wherein the processor is to apply power scaling values to the CSI estimates computed for the packets during their merging.

9. The receiver of claim 6, wherein the combined CSI estimate is adjusted by frequency responses of transmit and receive filters in the MIMO-OFDM system.

10. A method for extrapolating channel state information ("CSI") estimates from multiple packets sent over different antennas and different frequency channels to generate a combined CSI estimate for a multiple input, multiple output orthogonal frequency division multiplexing (MIMO-OFDM) system, the method comprising:

receiving packets on an m×$n_i$×$W_i$ channel configuration, wherein m is a number of receive antennas used to receive the packets, $n_i$ is a number of transmit antennas used to transmit a packet i, and $W_i$ is a number of OFDM channels for a packet i in the MIMO-OFDM system;

generating, by a processor, CSI estimates for the received packets;

adjusting, by the processor, the CSI estimates for the received packets based on a precoding matrix used for the m×$n_i$×$W_i$ channel configuration; and extrapolating the CSI estimates for the received packets to generate a combined CSI estimate for an m×q×R channel configuration, wherein q≥$n_i$ for all i and R>$W_i$.

11. The method of claim 10, wherein extrapolating the CSI estimates for the received packets to generate a combined CSI estimate comprises adjusting the combined CSI estimate by a power scaling and a precoding matrix used for the m×q×R channel configuration.

12. The method of claim 11, wherein adjusting the combined CSI estimate by a power scaling and a precoding matrix used for the m×q×R channel configuration comprises multiplying the combined CSI estimate by the power scaling and post-multiplying by the precoding matrix used for the m×q×R channel configuration.

13. The method of claim 10, further comprising adjusting the combined CSI estimate by frequency responses of transmit and receive filters in the MIMO-OFDM system.

14. The method of claim 10, further comprising interpolating the CSI estimates from available sub-channels to form missing CSI estimates.

* * * * *